US012708884B2

(12) United States Patent
Koo et al.

(10) Patent No.: US 12,708,884 B2
(45) Date of Patent: Aug. 18, 2026

(54) APPARATUS FOR DISSOLVING LITHIUM SALT POWDER

(71) Applicant: Hyundai BC Engineering Co., Ltd, Goyang-si (KR)

(72) Inventors: Kyosun Koo, Goyang-si (KR); Yunhye Song, Goyang-si (KR)

(73) Assignee: HYUNDAI BC ENGINEERING CO., LTD., Goyang-si (KR)

( * ) Notice: Subject to any disclaimer, the term of this patent is extended or adjusted under 35 U.S.C. 154(b) by 804 days.

(21) Appl. No.: 18/131,422

(22) Filed: Apr. 6, 2023

(65) Prior Publication Data

US 2024/0299894 A1 Sep. 12, 2024

(30) Foreign Application Priority Data

Mar. 8, 2023 (KR) ........................ 10-2023-0030539

(51) Int. Cl.

*B01F 23/50* (2022.01)
*B01F 27/00* (2022.01)
*B01F 35/43* (2022.01)
*B01F 35/71* (2022.01)
*B01J 8/00* (2006.01)
*B01J 8/16* (2006.01)
(Continued)

(52) U.S. Cl.

CPC ............. *B01J 8/008* (2013.01); *B01J 8/0015* (2013.01); *B01J 8/16* (2013.01); *H01M 10/0568* (2013.01); *H01M 10/0569* (2013.01); *H01M 2300/002* (2013.01)

(58) Field of Classification Search

CPC .......... B01J 8/008; B01J 8/0015; B01F 23/50; B01F 27/00; B01F 35/71; B01F 35/43

See application file for complete search history.

(56) References Cited

U.S. PATENT DOCUMENTS 4,662,669 A * 5/1987 Erickson .................. B01J 19/00 294/68.27
6,383,301 B1 * 5/2002 Bell ........................... B01J 8/12 406/134

(Continued)

FOREIGN PATENT DOCUMENTS

KR 10-2001-0022018 3/2001
KR 10-2015-0029300 3/2015

(Continued)

*Primary Examiner* — Douglas A Hess
(74) *Attorney, Agent, or Firm* — LEX IP MEISTER, PLLC

(57) ABSTRACT

The present invention relates to an apparatus for dissolving lithium salt powder which is used in preparation of a liquid electrolyte for a lithium ion battery, and more specifically, to an apparatus for dissolving lithium salt powder, which includes: a reactor 10 configured to supply an electrolyte solution; a powder hopper configured to supply lithium salt powder; a dissolution chamber 30 configured to forcibly mix the electrolyte solution and the lithium salt powder; and a powder supply pipe 40 configured to connect the powder hopper 20 and the dissolution chamber 30, wherein a hopper standing frame 70 is installed around the powder hopper 20, the hopper standing frame 70 is detachably loaded on a hopper vibrating unit 80, and a powder outlet 22 of the powder hopper 20 is connected to the powder supply pipe 40 by a vibration-proof connection pipe 23.

6 Claims, 4 Drawing Sheets

(51) Int. Cl.
*H01M 10/0568* (2010.01)
*H01M 10/0569* (2010.01)

(56) References Cited

U.S. PATENT DOCUMENTS

| | | | | |
|---|---|---|---|---|
| 8,497,346 | B2 * | 7/2013 | Chamayou | C08F 6/005 422/135 |
| 10,927,042 | B2 * | 2/2021 | Monkman | C04B 28/04 |
| 11,350,636 | B2 * | 6/2022 | Ueno | B01F 35/718 |
| 2022/0370966 | A1 * | 11/2022 | Schlack | |
| 2024/0173660 | A1 * | 5/2024 | Dooley et al. | |
| 2024/0269627 | A1 * | 8/2024 | Taniguchi | |
| 2025/0099886 | A1 * | 3/2025 | Pompeo et al. | |
| 2025/0242321 | A1 * | 7/2025 | Cui et al. | |
| 2025/0352965 | A1 * | 11/2025 | Du et al. | |

FOREIGN PATENT DOCUMENTS

| | | | | |
|---|---|---|---|---|
| KR | 10-2018-0080016 | | 7/2018 | |
| KR | 10-2382880 | | 4/2022 | |
| WO | WO-2009028020 | A1 * | 3/2009 | B01F 5/0206 |
| WO | WO-2021243126 | A1 * | 12/2021 | B01F 35/71 |
| WO | WO-2024132694 | A1 * | 6/2024 | C08J 11/12 |

* cited by examiner

[Fig. 1]
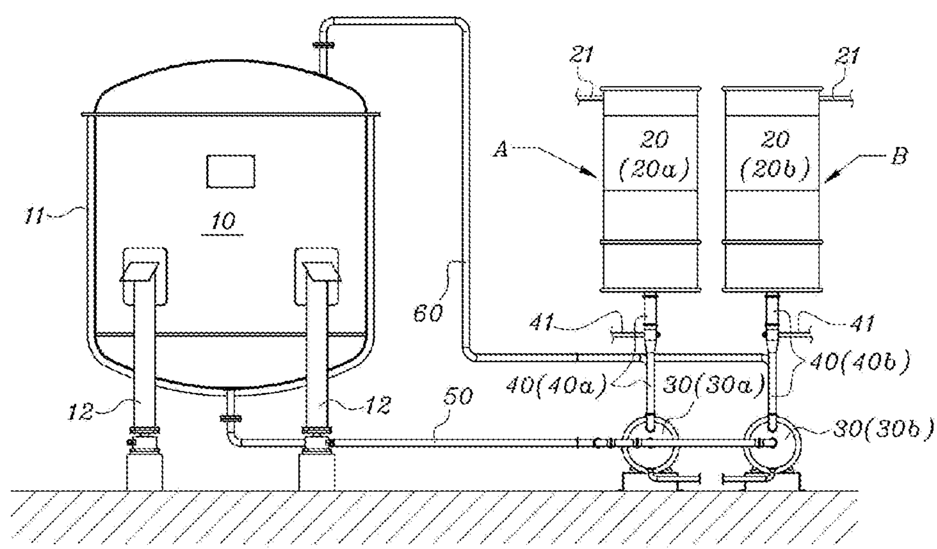
[Fig. 2]
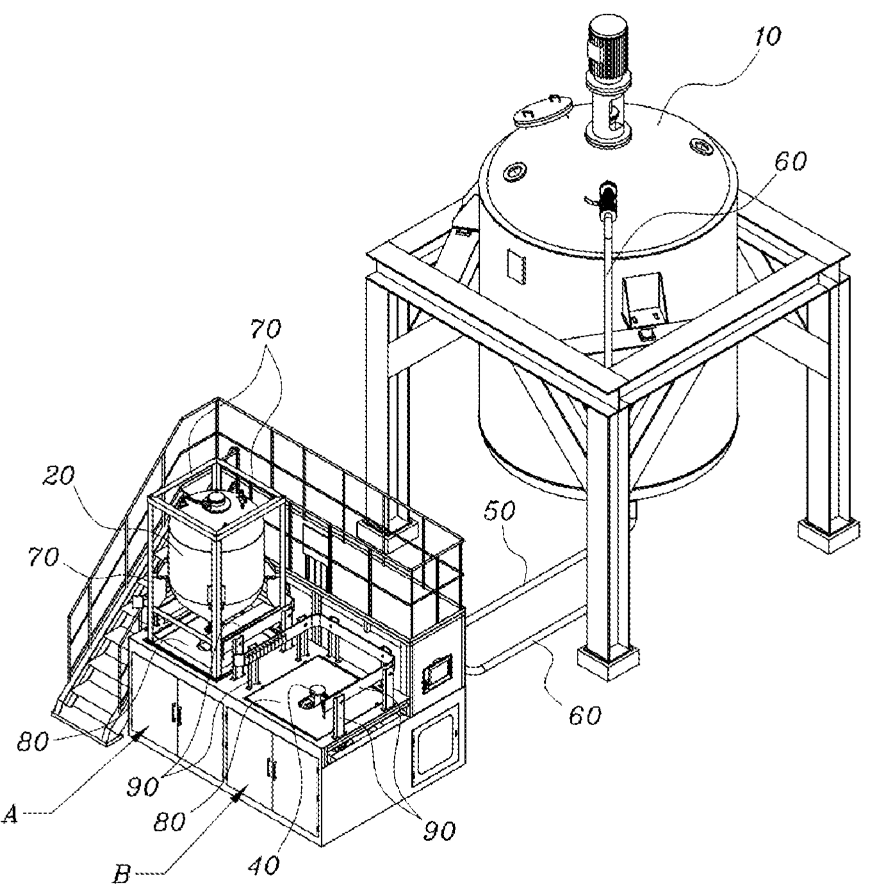

[Fig. 3]
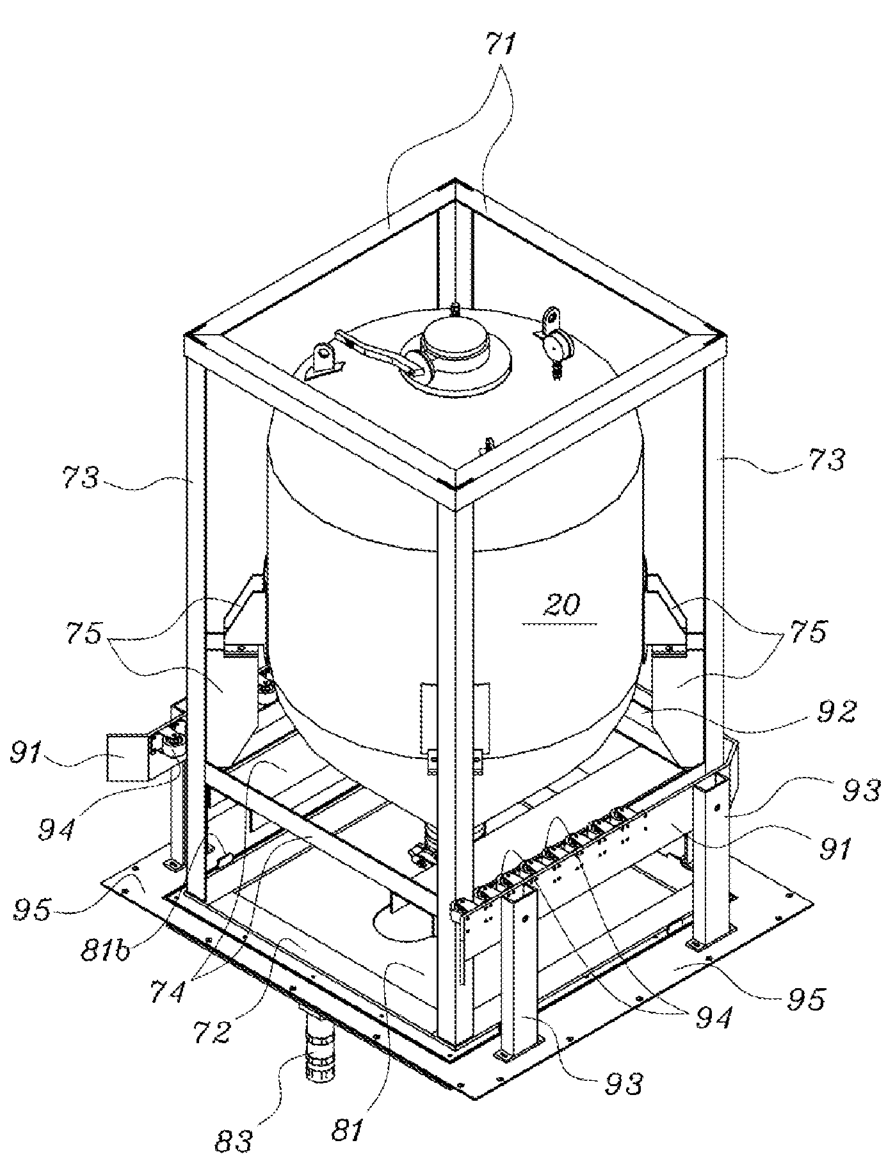

[Fig. 4]
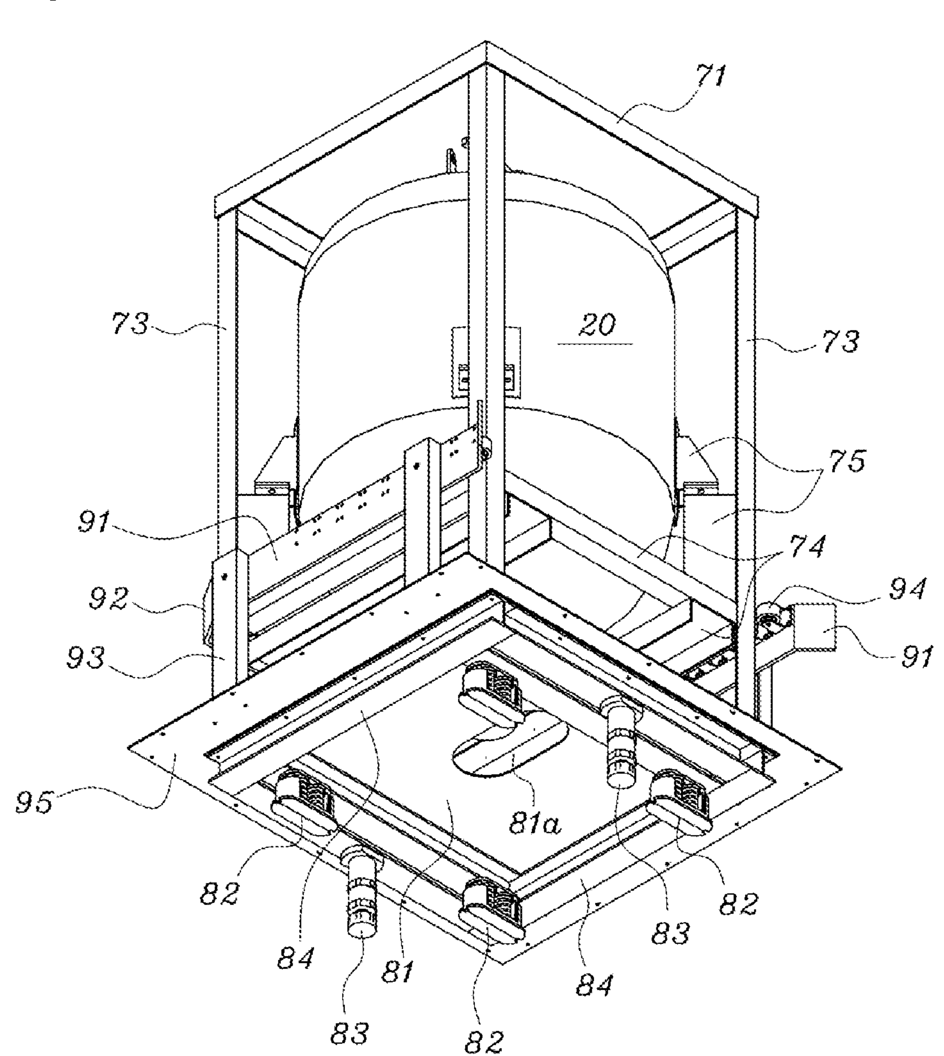

[Fig. 5]
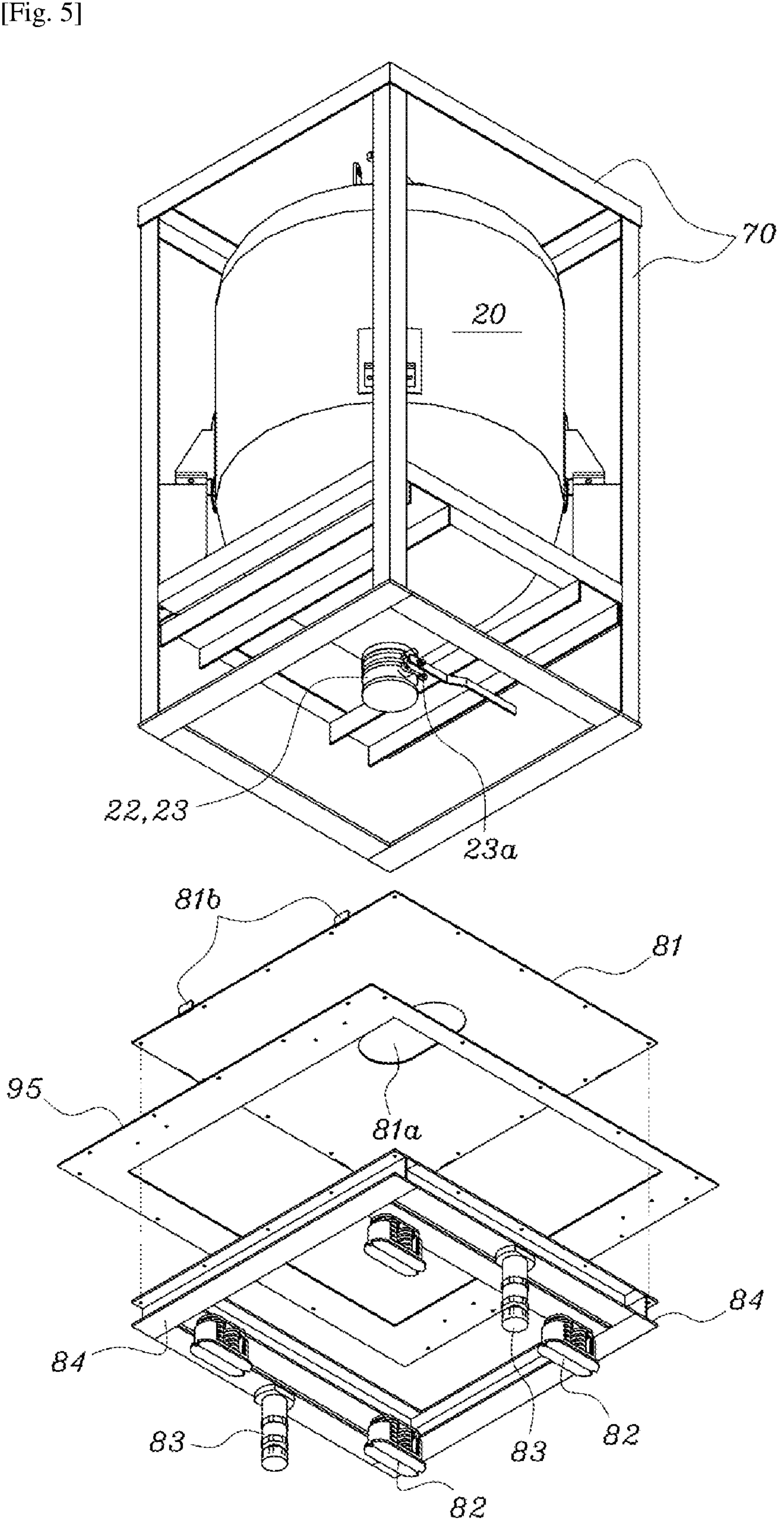

APPARATUS FOR DISSOLVING LITHIUM SALT POWDER

TECHNICAL FIELD

The present invention relates to an apparatus for dissolving lithium salt powder which is used in preparation of a liquid electrolyte for a lithium ion battery, and more specifically, to an apparatus for dissolving lithium salt powder, which includes: a reactor 10 configured to supply an electrolyte solution; a powder hopper 20 configured to supply lithium salt powder; a dissolution chamber 30 configured to forcibly mix the electrolyte solution and the lithium salt powder; and a powder supply pipe 40 configured to connect the powder hopper 20 and the dissolution chamber 30, wherein a hopper standing frame 70 is installed around the powder hopper 20, the hopper standing frame 70 is detachably loaded on a hopper vibrating unit 80, and a powder outlet 22 of the powder hopper 20 is connected to the powder supply pipe 40 by a vibration-proof connection pipe 23.

BACKGROUND ART

Lithium salts, which are used in preparation of a liquid electrolyte for a lithium ion battery, are very unstable compounds. For example, lithium hexafluorophosphate ($LiPF_6$) reacts with even a trace amount of moisture in air to produce highly toxic and corrosive hydrogen fluoride (HF). Therefore, in order to protect manufacturing facilities and workers and ensure the quality of a liquid electrolyte, the process of producing a liquid electrolyte for a lithium ion battery needs to be strictly managed so that an electrolyte solution does not come into contact with even a trace amount of moisture in the entire production process.

As conventional techniques, Korean Unexamined Patent Publication No. 10-2013-0018504 (2013 Feb. 25), Korean Unexamined Patent Publication No. 10-2015-29300 (2015 Mar. 18), and Korean Unexamined Patent Publication No. 10-2018-80016 (2018 Jul. 11) disclose powder dissolution apparatuses that can be used in a facility for preparing a liquid electrolyte. The conventional powder dissolution apparatuses have a vertical structure in which a hopper that supplies powder is disposed above a reaction container.

When a liquid electrolyte for a lithium ion battery is prepared using the conventional powder dissolution apparatus, a hopper that supplies lithium salt powder needs to be installed at a height of at least about 3 m. Accordingly, the installation of a hoist for transporting and installing the lithium salt powder hopper is required, and furthermore, it is very dangerous and difficult to replace and install the powder hopper.

In order to solve the above problem, the inventors of the present invention have proposed a lithium salt powder dissolution apparatus with a new structure, as shown in FIG. 1, in Korean Registered Patent No. 10-2382880 (2022 Mar. 31). The lithium salt powder dissolution apparatus has a structure in which a dissolution chamber 30 that forcibly mixes and dissolves an electrolyte solution and lithium salt powder is disposed between a closed reactor 10 that stores the electrolyte solution and a closed powder container 20 that stores the lithium salt powder.

A powder supply pipe 40 that supplies lithium salt powder is installed between the powder container 20 and the dissolution chamber 30, and a solution discharge pipe 50 and a solution return pipe 60, which transfer an electrolyte solution, are installed between the reactor 10 and the dissolution chamber 30. Due to the negative pressure generated in the dissolution chamber 30, the lithium salt powder from the powder container 20 is automatically introduced into the dissolution chamber 30

In the case of the lithium salt powder dissolution apparatus of FIG. 1, a reactor 10 and a powder container 20 are separated from each other in left and right positions, and forcible mixing and dissolution of an electrolyte solution and lithium salt powder are made using a dissolution chamber 30 disposed therebetween in an entirely closed system. As a result, a safe working environment can be implemented, and a high-quality liquid electrolyte can be efficiently prepared.

However, when a crosslinking phenomenon in which lithium salt powder filled in the powder container 20 is compacted and thus entangled occurs when lithium salt powder is discharged from the powder container 20, the lithium salt powder may not be smoothly supplied to the dissolution chamber 30. In terms of this problem, improvement is still required.

RELATED ART DOCUMENTS

Patent Documents

Korean Laid-Open Patent Publication No. 10-2018-0080016 (2018 Jul. 11),

Korean Laid-Open Patent Publication No. 10-2015-0029300 (2015 Mar. 18)

Korean Laid-Open Patent Publication No. 10-2001-0022018 (2001 Mar. 15)

Korean Laid-Open Patent Publication No. 10-2382880 (2022 Mar. 31)

DISCLOSURE

Technical Problem

The present invention is directed to improving the structure of the lithium salt powder dissolution apparatus.

The present invention is also directed to providing a lithium salt powder dissolution apparatus, which is capable of smoothly discharging lithium salt powder that is supplied to a dissolution chamber without any residue by preventing the crosslinking phenomenon of lithium salt powder in a powder container.

The present invention is also directed to providing a lithium salt powder dissolution apparatus, which is capable of enabling quicker and easier transport and replacement of a powder container.

Hereinafter, an "electrolyte solution" in the present invention may be in a state in which lithium salt powder is not yet dissolved in a solvent such as an organic carbonate compound or a state in which a predetermined amount of lithium salt powder is dissolved in the solvent.

In addition, the same terms and reference numerals are used for components, which are substantially the same as those of a lithium salt powder dissolution apparatus of FIG. 1, among the components of the present invention. However, the term "powder container 20" is changed to the term "powder hopper 20."

Technical Solution

The present invention provides an apparatus for dissolving lithium salt powder, which includes: a closed reactor 10 configured to supply an electrolyte solution for preparing a liquid electrolyte; a powder hopper 20 configured to supply lithium salt powder; a dissolution chamber 30 configured to forcibly mix the electrolyte solution and the lithium salt powder and allow the resulting mixture to be circulated toward the reactor 10; a powder supply pipe 40 configured to connect the powder hopper 20 and the dissolution chamber 30; and a solution discharge pipe 50 and a solution return pipe 60 configured to connect the reactor 10 and the dissolution chamber 30, wherein a hopper standing frame 70 configured to support the powder hopper so that the powder hopper stands upright in a state in which a powder outlet 22 is positioned at the bottom is installed around the powder hopper 20, the hopper standing frame 70 is detachably loaded on a hopper vibrating unit 80 configured to impart vibrations to the powder hopper 20, and the powder outlet 22 is connected to the powder supply pipe 40 by a vibration-proof connection pipe 23 made of a vibration-absorbing elastomer.

In addition, a guard rail 90 configured to guide the entry and exit of the hopper standing frame 70 and prevent the hopper standing frame 70 from being detached is installed around the hopper vibrating unit 80.

Advantageous Effects

In the case of the apparatus for dissolving lithium salt powder according to the present invention, since a reactor 10 and a powder hopper 20 are disposed while being horizontally separated from each other, a facility and work space can be conveniently and efficiently used. Furthermore, since the selective operation of a first powder dissolution line A and a second powder dissolution line B is possible, the dissolution apparatus can be continuously operated without waiting time during replacement of the powder hopper 20.

In addition, the apparatus for dissolving lithium salt powder according to the present invention can smoothly discharge lithium salt powder stored in the powder hopper 20 without any residue using a hopper vibrating unit 80. Furthermore, since the structure of a hopper standing frame 70 is configured so that the powder hopper 20 can be easily lifted using a forklift, the replacement and transport of the powder hopper 20 can be quickly and safely performed.

DESCRIPTION OF DRAWINGS

The above and other objects, features and advantages of the present invention will become more apparent to those of ordinary skill in the art by describing exemplary embodiments thereof in detail with reference to the accompanying drawings, in which:

FIG. 1 is a configuration diagram of a conventional apparatus for dissolving lithium salt powder for preparing a liquid electrolyte;

FIG. 2 is a perspective view of an apparatus for dissolving lithium salt powder according to the present invention;

FIGS. 3 and 4 are exploded perspective views of a powder hopper 20, a hopper standing frame 70, a hopper vibrating unit 80, and a guard rail 90 of FIG. 2; and FIG. 5 is an exploded perspective view of FIG. 4.

MODES OF THE INVENTION

Hereinafter, the present invention will be described in detail with reference to accompanying drawings. However, since the accompanying drawings illustrate exemplary embodiments of the present invention, the scope of the present invention is not limited to these embodiments. Also, even though a configuration is essential for carrying out the present invention, when the configuration is introduced in the conventional technique or can be easily implemented by those skilled in the art from known techniques, a detailed description thereof will be omitted.

As shown in FIG. 2, an apparatus for dissolving lithium salt powder for preparing a liquid electrolyte according to the present invention includes: a reactor 10, a powder hopper 20, a dissolution chamber 30, a powder supply pipe 40, a solution discharge pipe 50, a solution return pipe 60, a hopper standing frame 70, and a hopper vibrating unit 80. Among these components, the structures and functions of the reactor 10, the powder hopper 20, the dissolution chamber 30, the powder supply pipe 40, the solution discharge pipe 50, and the solution return pipe 60 are almost the same as those shown in FIG. 1.

First, the reactor 10 is a closed reaction container and functions to store a solvent, for example, an organic carbonate compound, used in preparation of a liquid electrolyte before a liquid electrolyte preparation process according to the present invention starts and to recover, store, and circulate an electrolyte solvent including lithium salts dissolved therein while a liquid electrolyte preparation process proceeds. A cooling pocket 11 in which cooling water is circulated is installed outside the reactor 10, as shown in FIG. 1.

Next, the powder hopper 20 is a place where powder-type lithium salts are stored and has a closed structure to block contact with external air. The powder hopper 20 may be installed at a similar height to that of the reactor 10 at a position spaced apart from the reactor 10. In the powder hopper 20, lithium salt powder used in preparation of a liquid electrolyte for a lithium ion battery, for example, $LiPF_6$, $LiBF_4$, LiBOB, or the like, is stored.

The dissolution chamber 30 is disposed between the reactor 10 and the powder hopper 20, and preferably below the powder hopper 20 and functions to forcibly mix and dissolve an electrolyte solution supplied from the reactor 10 and lithium salt powder supplied from the powder hopper 20. In FIG. 2, since the dissolution chamber 30 is hidden inside the body of the dissolution apparatus according to the present invention, it is not shown.

The powder supply pipe 40 is a passage through which lithium salt powder is supplied from the powder hopper 20 to the dissolution chamber 30 and is vertically installed between the powder hopper 20 and the dissolution chamber 30. In the powder supply pipe 40, a control valve configured to control or block the supply of lithium salt powder may be installed. In FIG. 2, only the upper end of the powder supply pipe 40 is exposed.

The solution discharge pipe 50 is a passage through which an electrolyte solution is transferred from the bottom of the reactor 10 to the dissolution chamber 30, and the solution return pipe 60 is a passage through which an electrolyte solution in which lithium salt powder is mixed is transferred from the dissolution chamber 30 to the top of the reactor 10. In the solution discharge pipe 50 and the solution return pipe 60, a control valve configured to control or block the transfer of an electrolyte solution may be installed.

Meanwhile, an impeller rotating by a driving motor is provided in the dissolution chamber 30. Therefore, the electrolyte solution and the lithium salt powder are forcibly mixed by the rotational force of the impeller, and simultaneously, the resulting mixture is forcibly extruded from the solution discharge pipe 50 to the solution return pipe 60. Also, due to the negative pressure generated in the dissolution chamber 30, the lithium salt powder stored in the powder hopper 20 is automatically introduced into the dissolution chamber 30 via the powder supply pipe 40.

In addition, nitrogen purging pipes 21 and 41 configured to supply nitrogen gas may be connected to the powder hopper 20 and the powder supply pipe 40 as shown in FIG. 1, and a nitrogen supply means may be installed at the end of the nitrogen purging pipes 21 and 41. The nitrogen purging pipe 21 connected to the powder hopper 20 functions to supply nitrogen gas so that a vacuum is not generated in the powder hopper 20 when lithium salt powder is discharged and to clearly remove residues in the powder hopper 20 and block contact with air after lithium salt powder is completely discharged.

According to an exemplary embodiment of the present invention, a first powder dissolution line A and a second powder dissolution line B may be installed in parallel between the solution discharge pipe 50 and the solution return pipe 60. In this case, the first powder dissolution line A is composed of a first powder hopper 20*a*, a first dissolution chamber 30*a*, and a first powder supply pipe 40*a*, and the second powder dissolution line B is composed of a second powder hopper 20*b*, a second dissolution chamber 30*b*, and a second powder supply pipe 40*b*.

The first powder dissolution line A and the second powder dissolution line B have substantially the same operating structure and function and are configured to selectively operate any one of them as needed. Therefore, when the first powder dissolution line A is operated, nitrogen purging of the second powder hopper 20*b* and the second powder supply pipe 40*b* may be performed using the nitrogen purging pipes 21 and 41, and when the second powder dissolution line B is operated, nitrogen purging of the first powder hopper 20*a* and the first powder supply pipe 40*a* may be performed.

Meanwhile, as shown in FIGS. 3 to 5, the hopper standing frame 70 is installed around the powder hopper 20 and functions to support the powder hopper so that the powder hopper stands upright in a state in which a powder outlet 22 of the powder hopper 20 is positioned at the bottom. According to an exemplary embodiment of the present invention, the hopper standing frame 70 has a rectangular parallelepiped shape and includes an upper frame 71, a lower frame 72, a vertical frame 73, a support frame 74, and a fixing bracket 75.

The upper frame 71 and the lower frame 72 are disposed above and below the powder hopper 20, respectively, and have a quadrilateral shape. The vertical frame 73 vertically connects the corners of the upper frame 71 and the lower frame 72. The support frame 74 is horizontally installed in the middle of the vertical frame 73 and supports a lower slope of the powder hopper 20. Finally, the fixing bracket 75 fixes a side surface of the powder hopper 20 to the vertical frame 73.

The hopper vibrating unit 80 functions to impart vibrations to the powder hopper 20 while detachably loading the hopper standing frame 70. In this case, the powder outlet 22 positioned at the bottom of the powder hopper 20 is connected to the powder supply pipe 40 by a vibration-proof connection pipe 23 made of an elastomer. The vibration-proof connection pipe 23 is firmly fastened to the upper end of the powder supply pipe 40 by a clamp 23*a* and absorbs vibrations caused by the hopper vibrating unit 80.

In the present invention, the hopper standing frame 70 and the powder hopper 20 vibrate due to the hopper vibrating unit 80, but the powder supply pipe 40 does not vibrate. Therefore, when there is no vibration-proof connection pipe 23, a gap may be generated between the powder outlet 22 and the powder supply pipe 40 due to vibrations caused by the hopper vibrating unit 80, and as a result, a serious accident in which the lithium salt powder leaks through the gap may occur.

The hopper vibrating unit 80 includes a hopper loading plate 81, a vibration-proof mount 82, and a vibrator 83 and may further include a reinforcement frame 84. First, the hopper loading plate 81 is intended to load the hopper standing frame 70 and has a central hole 81*a* through which the powder supply pipe 40 passes in a non-contact state in the center. The hopper standing frame 70 may be loaded on the hopper loading plate 81, and a detachment preventing protrusion 81*b* configured to prevent the lower frame 72 from being detached protrudes at the edge of the hopper loading plate 81.

Next, the vibration-proof mount 82 elastically supports the hopper loading plate 81 from the body of the dissolution apparatus according to the present invention and blocks vibrations of the hopper loading plate 81 from being transmitted to the body of the dissolution apparatus. As the vibration-proof mount 82, for example, a spring mount or a rubber mount may be used.

The vibrator 83 functions to vertically or horizontally vibrate the hopper loading plate 81, and for example, a pneumatic, hydraulic, or electric vibrator may be used. Finally, the reinforcement frame 84 is attached to a lower surface of the hopper loading plate 81 and reinforces structural strength, and the vibration-proof mount 82 and the vibrator 83 may be installed thereon.

According to an exemplary embodiment of the present invention, a guard rail 90 configured to guide the entry and exit of the hopper standing frame 70 and prevent the hopper standing frame 70 from being detached may be installed around the hopper vibrating unit 80, and the guard rail 90 may include a side rail 91, a rear rail 92, and a rail support 93.

The side rail 91 is horizontally disposed on each of the left and right sides of the hopper standing frame 70, and the rear rail 92 is horizontally disposed at the rear of the hopper standing frame 70. The rail support 93 supports the side rail 91 and the rear rail 92 at a predetermined height. In this case, the height of the side rail 91 and the rear rail 92 preferably corresponds to that of the support frame 74 of the hopper standing frame 70.

The front of the guard rail 90 is open so that the entry and exit of the hopper standing frame 70 is allowed, and a guide roller 94 configured to guide the entry and exit of the hopper standing frame 70 may be installed inside the side rail 91. The rail support 93 stands on a rail installation plate 95 surrounding the hopper loading plate 81 in a spaced apart state, and the rail installation plate 95 is fixed to the body of the dissolution apparatus.

In the dissolution apparatus according to the present invention, only a pure solvent in which lithium salts are not dissolved is stored in the reactor 10 before a liquid electrolyte preparation process starts, and the solvent stored in the reactor 10 is introduced into the dissolution chamber 30 via the solution discharge pipe 50 after a liquid electrolyte preparation process starts. Also, the lithium salt powder supplied from the powder hopper 20 is forcibly mixed with and dissolved in the solvent in the dissolution chamber 30.

The electrolyte solution that has passed through the dissolution chamber 30 is returned in a state in which a small amount of lithium ions is dissolved therein to the reactor 10 via the solution return pipe 60, and then mixed with an electrolyte solvent remaining in the reactor 10. In this way, as the electrolyte solution circulates the reactor 10, the solution discharge pipe 50, the dissolution chamber 30, and the solution return pipe 60, the concentration of lithium ions is gradually increased, and when the concentration of lithium ions dissolved in the electrolyte solution reaches a predetermined value, the liquid electrolyte preparation process is terminated.

In the liquid electrolyte preparation process, the powder hopper 20 in which lithium salt powder is completely exhausted is replaced with a new powder hopper 20. In this case, when lithium salt powder remains in the powder hopper 20, odorous smoke, dust, or toxic hydrogen fluoride may be generated during the replacement process, which may harm the safety of workers. However, in the present invention, the lithium salt powder remaining in the powder hopper 20 can be cleanly discharged without any crosslinking phenomenon or residue using the hopper vibrating unit 80 and the nitrogen purging pipe 21.

In addition, the hopper standing frame 70 has a structure very suitable for transporting the powder hopper 20 using a forklift. In other words, when both forks of a forklift are inserted below the support frame 74 of the hopper standing frame 70, the powder hopper 20 can be easily lifted along with the hopper standing frame 70.

Therefore, in the present invention, the powder hopper 20 can be easily replaced using a forklift. Also, by alternately replacing the powder hopper 20 in the first powder dissolution line A and the second powder dissolution line B, the dissolution apparatus of the present invention can be continuously operated without waiting time.

[List of Reference Numerals]

| | |
|---|---|
| (10) reactor | (11) cooling pocket |
| (20, 20a, 20b) powder hopper | (21, 41) nitrogen purging pipe |
| (22) powder outlet | (23) vibration-proof connection pipe |
| (30, 30a, 30b) dissolution chamber | (40, 40a, 40b) powder supply pipe |
| (50) solution discharge pipe | (60) solution return pipe |
| (70) hopper standing frame | (71) upper frame |
| (72) lower frame | (73) vertical frame |
| (74) support frame | (75) fixing bracket |
| (80) hopper vibrating unit | (81) hopper loading plate |
| (82) vibration-proof mount | (83) vibrator |
| (84) reinforcement frame | (90) guard rail |
| (91) side rail | (92) rear rail |
| (93) rail support | (94) guide roller |
| (95) rail installation plate | |

The invention claimed is:

1. An apparatus for dissolving lithium salt powder, comprising:

a closed reactor (10) configured to supply an electrolyte solution for preparing a liquid electrolyte;

a powder hopper (20) configured to supply lithium salt powder;

a dissolution chamber (30) configured to forcibly mix the electrolyte solution and the lithium salt powder and allow the resulting mixture to be circulated toward the reactor (10);

a powder supply pipe (40) configured to connect the powder hopper (20) and the dissolution chamber (30); and a solution discharge pipe (50) and a solution return pipe (60) configured to connect the reactor (10) and the dissolution chamber (30), wherein a hopper standing frame (70) configured to support the powder hopper so that the powder hopper stands upright in a state in which a powder outlet (22) is positioned at the bottom and the hopper standing frame is installed around the powder hopper (20), the hopper standing frame (70) is detachably loaded on a hopper vibrating unit (80) configured to impart vibrations to the powder hopper (20), and the powder outlet (22) is connected to the powder supply pipe (40) by a vibration-proof connection pipe (23) made of a vibration-absorbing elastomer.

2. The apparatus of claim 1, wherein the hopper standing frame (70) includes:

a quadrilateral-shaped upper frame (71) disposed above the powder hopper (20);

a quadrilateral-shaped lower frame (72) disposed below the powder hopper (20);

a plurality of vertical frames (73) configured to vertically connect the upper frame (71) and the lower frame (72);

a support frame (74) configured to support a lower slope of the powder hopper (20) in the middle of the vertical frame (73); and a fixing bracket (75) configured to fix a side surface of the powder hopper (20) to the vertical frame (73).

3. The apparatus of claim 1, wherein the hopper vibrating unit (80) includes:

a hopper loading plate (81) intended to load the hopper standing frame (70) and having a central hole (81*a*) through which the powder supply pipe (40) passes in a non-contact state in the center;

a vibration-proof mount (82) configured to support the hopper loading plate (81); and a vibrator (83) configured to vibrate the hopper loading plate (81).

4. The apparatus of claim 3, wherein a detachment preventing protrusion (81*b*) configured to prevent the hopper standing frame (70) from being detached protrudes at the edge of the hopper loading plate (81), and a reinforcement frame (84) on which the vibration-proof mount (82) is installed and the reinforcing frame is attached to a lower surface of the hopper loading plate (81).

5. The apparatus of claim 1, wherein a guard rail (90) configured to guide the entry and exit of the hopper standing frame (70) and prevent the hopper standing frame (70) from being detached is installed around the hopper vibrating unit (80), the guard rail (90) includes: a side rail (91) disposed on each of the left and right sides of the hopper standing frame (70); a rear rail (92) disposed at the rear of the hopper standing frame (70); and a rail support (93) configured to support the side rail (91) and the rear rail (92) at a predetermined height, and the front of the guard rail (90) is open so that the entry and exit of the hopper standing frame (70) is allowed.

6. The apparatus of claim 5, wherein a guide roller (94) configured to guide the entry and exit of the hopper standing frame (70) is installed inside the side rail (91).

* * * * *